United States Patent
Inge et al.

(10) Patent No.: US 11,654,394 B2
(45) Date of Patent: May 23, 2023

(54) METHOD AND INSTALLATION FOR REMOVING A GAS FROM A FLOW OF A GAS MIXTURE

(71) Applicant: 3NINE AB, Nacka Strand (SE)

(72) Inventors: Claes Inge, Nacka (SE); Peter Franzén, Bandhagen (SE); Carl Petrus Häggmark, Taby (SE)

(73) Assignee: ARKALUMEN INC., Ottawa (CA)

( * ) Notice: Subject to any disclaimer, the term of this patent is extended or adjusted under 35 U.S.C. 154(b) by 26 days.

(21) Appl. No.: 17/436,018

(22) PCT Filed: Mar. 4, 2020

(86) PCT No.: PCT/SE2020/050237
§ 371 (c)(1),
(2) Date: Sep. 2, 2021

(87) PCT Pub. No.: WO2020/180235
PCT Pub. Date: Sep. 10, 2020

(65) Prior Publication Data
US 2022/0176315 A1    Jun. 9, 2022

(30) Foreign Application Priority Data

Mar. 6, 2019 (SE) .................................. 1950286-3

(51) Int. Cl.
*B01D 53/50* (2006.01)
*B01D 53/92* (2006.01)

(52) U.S. Cl.
CPC ......... *B01D 53/504* (2013.01); *B01D 53/502* (2013.01); *B01D 53/92* (2013.01);
(Continued)

(58) Field of Classification Search
CPC .... B01D 53/504; B01D 53/502; B01D 53/92; B01D 2247/101; B01D 2251/304;
(Continued)

(56) References Cited

U.S. PATENT DOCUMENTS 5,512,085 A    4/1996 Schwab
6,491,882 B1   12/2002 Van Den Berg et al.
(Continued)

FOREIGN PATENT DOCUMENTS

CN    105833695    12/2018
WO    1995019220   7/1995
(Continued)

OTHER PUBLICATIONS

International Search Report and Written Opinion for International Patent Application No. PCT/SE2020/050237 dated May 28, 2020, 13 pages.
(Continued)

*Primary Examiner* — Timothy C Vanoy
(74) *Attorney, Agent, or Firm* — Sean Murray; Murray IP Consulting Inc.

(57) ABSTRACT

A method and installation for removing a gas from a flow of a gas mixture. A first liquid (82) is introduced in the flow (106) for evaporative cooling and saturation of the gas mixture. Small droplets of a second liquid (84) are provided which are capable of adsorbing and dissolving said gas and of a size small enough not to be sedimented by gravitation and big enough to be centrifugally separated. The small droplets are sprayed into the flow for adsorbing and dissolving said gas into the droplets, and the small droplets are centrifugally separated from the flow.

18 Claims, 1 Drawing Sheet

(52) U.S. Cl.
CPC .. *B01D 2247/101* (2013.01); *B01D 2251/304* (2013.01); *B01D 2251/604* (2013.01); *B01D 2257/302* (2013.01); *B01D 2258/012* (2013.01); *B01D 2259/10* (2013.01); *B01D 2259/4566* (2013.01)

(58) Field of Classification Search
CPC ........ B01D 2251/604; B01D 2257/302; B01D 2258/012; B01D 2259/10; B01D 2259/4566; B01D 45/12; B01D 51/10; F23J 2215/20
See application file for complete search history.

(56) References Cited

U.S. PATENT DOCUMENTS

2009/0148371 A1   6/2009  Reddy et al.
2016/0332113 A1*  11/2016 Jenkins ................. B01D 47/10

FOREIGN PATENT DOCUMENTS

| WO | 2014128261 | 8/2014  |
|----|------------|---------|
| WO | 2015106355 | 7/2015  |
| WO | 2018231105 | 12/2018 |

OTHER PUBLICATIONS

Office Action, Swedish application No. SE 1950286-3, dated Sep. 2, 2019, 6 pages.

"Sustainable Flue-Gas Quench For waste incineration plants within a water-energy-environment nexus perspective" Al Hamrani, E., Gronberg N.; Degree Project Jun. 2017; School of Business, Society and Engineering; 49 pages.

"High-Pressure Phenomena," Encyclopedia Britannica, published Mar. 3, 2009, https://www.britannica.com/print/article/265315, date accessed: Dec. 28, 2022.

* cited by examiner

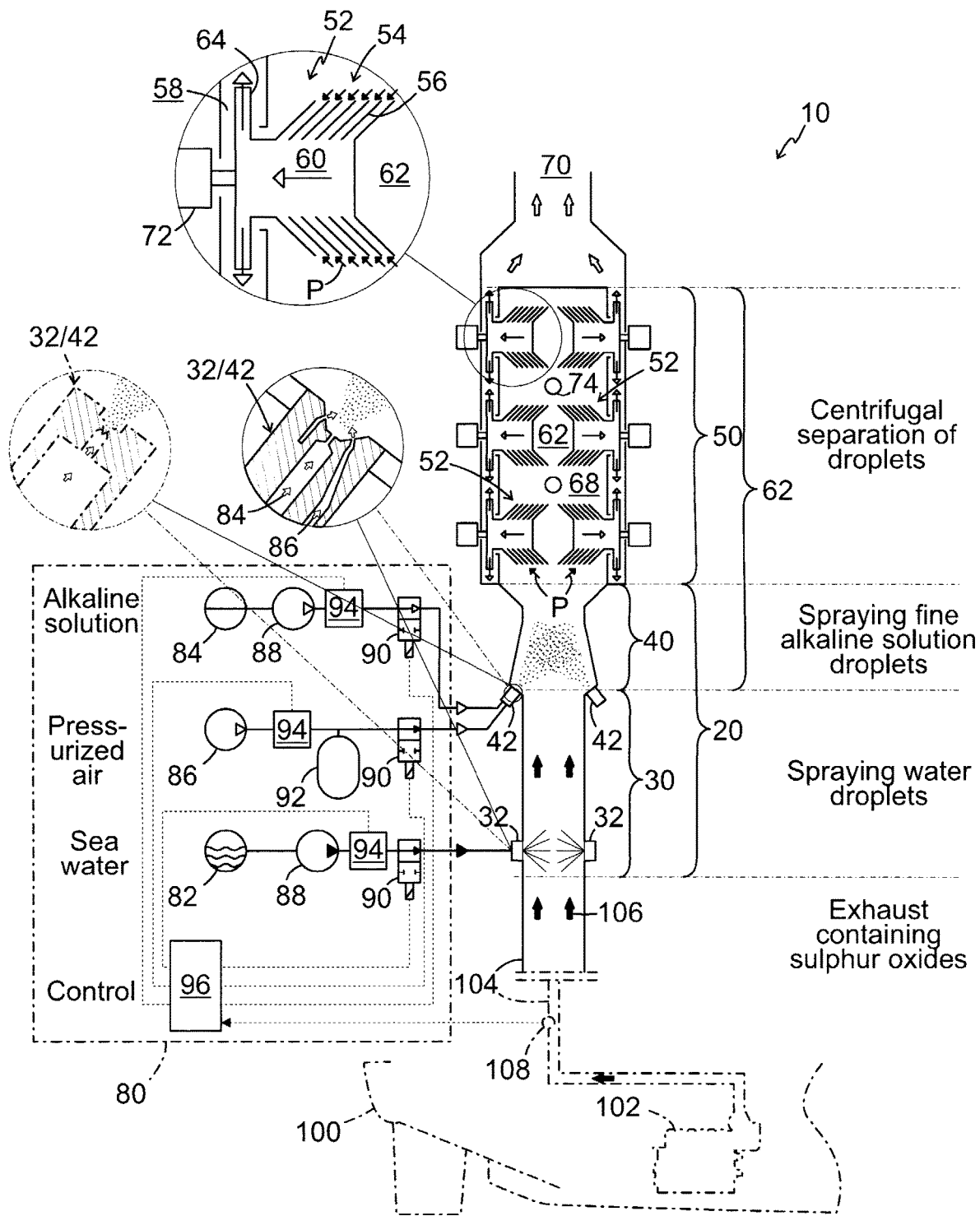

METHOD AND INSTALLATION FOR REMOVING A GAS FROM A FLOW OF A GAS MIXTURE

FIELD OF THE INVENTION

This invention relates to a method of removing a gas from a flow of a gas mixture.

The invention also relates to an installation for performing the method.

BACKGROUND OF THE INVENTION

Prior art systems for reduction of sulphur oxides (SOx), such as sulphur dioxide, in the exhaust gases from diesel engines on ships are mainly based on various types of scrubbers. For this, wet scrubbers are mostly used, where an aerosol of an alkaline solution, e.g. sodium hydroxide (NaOH), is sprayed into the scrubber in a so-called closed loop system, to bring it to react with the sulphur oxides to form e.g. water-soluble salts or other disposable reaction products. This is often the case when the ship is in a harbor or when the sea water in not sufficiently alkaline. In case the sea water itself is sufficiently alkaline, a so-called open loop system could be used at sea, where an aerosol of sea water is added to react with the sulphur oxides in the exhaust gases for the removal thereof.

These scrubber systems require vast volumes of spray water for the exhaust gas to enter the aerosol drops, and the drops need to be very large and the exhaust gas flow needs to very slow for the drops to be capable of being sedimented by gravitation against the air flow in the scrubber. This in turn makes the installation very large.

In order to improve these systems, a compact system forming the basis of the present invention and disclosed in WO2018/231105 A1 proposes spraying the aerosol under high pressure into the flow of the exhaust gases and using centrifugal technology to separate the droplets from the gas flow. Thereby it is possible to use less amount of water to obtain very small droplets having a larger total surface area capable of quickly reacting with the sulphur dioxides. The amount of water needed to be sprayed is then only about 2.5 to 5% compared to that of the prior art systems, while maintaining the separation effect.

SUMMARY OF THE INVENTION

An object of this invention is to further generally improve methods and installations of the prior art, and specifically specifically such disclosed in WO2018/231105 A1 to better meet new requirements that do not allow emissions of more than those corresponding to 0.1% of sulphur in the diesel fuel.

In one aspect of the invention the method comprises
introducing a first liquid in the flow for evaporative cooling and saturation of the gas mixture;
providing small droplets of a second liquid capable of adsorbing and dissolving said gas and of a size small enough not to be sedimented by gravitation and big enough to be centrifugally separated;
spraying the small droplets into the flow for dissolving said gas into the droplets; and
centrifugally separating the small droplets from the flow.

While the invention may be generally carried out in various applications of removing a gas from a flow of a gas mixture, the present disclosure is specifically exemplified as applied for removing sulphur dioxides from a combustion exhaust gas such as from a marine diesel engine as mentioned above. Examples of such various applications may be found in the following documents:

EP2499091, EP2747877, U.S. Pat. No. 8,444,942, EP2298957, EP1524023, WO2016/062731, and EP3393625.

Supplying the liquids in two separated steps has the following advantages generally and in the specific application:

The initial step of introducing the first liquid, for example water, results in the evaporation that provides saturation and also cooling of a hot (for example 300 to 400° C.) gas mixture, for example exhaust gas mixture, and in the saturation that brings the evaporation to halt. The evaporation and saturation in the first liquid introduction step importantly result in that the small droplets of the second liquid will keep their size. Otherwise, like in the single spraying step of WO2018/231105 A1, water will continue to evaporate from the droplets with cooling action and subsequent lost control of droplet size. Accordingly, the saturation in the water introduction step effectively prevents evaporation from droplets introduced in the spraying step. The cooling is also advantageous in that common centrifugal separators cannot sustain excessive heat.

By the droplets of the second liquid being of a size small enough not to be sedimented by gravitation and big enough to be centrifugally separated, they will be securely carried forward in the flow and separated from the flow in the centrifugal separation step.

The first liquid may be introduced by spraying small droplets of the first liquid into the flow. Small droplets provides quick cooling and resulting saturation.

The small droplets of the first liquid may be formed by atomization with pressurized air using a two-fluid nozzle or with high-pressure liquid spray using a single-fluid nozzle. The two-fluid nozzle may be advantageous for creating very small droplets to obtain as fast as possible cooling.

The small droplets of the second liquid may also be formed by atomization with pressurized air using a two fluid nozzle or with high-pressure liquid spray using a single-fluid nozzle. The single fluid nozzle may be advantageous for producing more droplets per time unit, that in turn may also require a less number of nozzles.

The atomization of the liquids will produce aerosols having small droplets for providing a large total surface area, enabling short reaction times for the first and second liquids with little or no need to slow down a given flow rate, and, specifically in the diesel engine exhaust flow case, to obtain fast evaporative water cooling and saturation in the first step and to neutralize sulphur oxides by alkaline in the droplets. Thereby, the system can also be kept very compact.

By generating the atomization with pressurized air, the size of droplets can be controlled by varying flow rates of air and alkaline water solution.

The size of the droplets may also be controlled by varying only a pressure of the pressurized air. That may be the case when atomizing nozzles and flow rate of alkaline solution are already determined.

The size may be controlled to vary between about 20 and 200 µm, typically to be about 50 µm. Still smaller droplets in the gas flow may pass through the separation step in an undesired manner. The size is more formally correct to be understood as the size of a medium sized droplet. For example, a medium size of $d_{v50}$ means that 50% of the droplet volume are drops having a diameter larger than $d_{v50}$. The typical distribution of $d_{v50}$ of 50 µm contains droplets from 20 to 130 µm (10% of the volume are droplets less than 20 µm and 90% of the volume are droplets less than 130 µm).

The small droplets of the second liquid can be sprayed downstream of spraying the first liquid into the flow. Thereby the flow may be given time to be sufficiently saturated.

The spraying of the aerosol droplets can be co-current with the flow of exhaust gases.

The first liquid may be water and the second liquid may be an alkaline water solution.

The gas mixture may be a combustion exhaust gas and the gas to be removed may be a gas comprising sulphur oxides.

Specifically, the gas mixture may be an exhaust gas flow from a marine diesel engine and the gas to be removed may be a gas comprising sulphur oxides.

An installation for performing the method according to the invention is to be inserted in a path of an exhaust flow of an exhaust pipe for performing the method comprises spray nozzles for the water and the alkaline water solution; and at least one centrifugal separator downstream of the spraying nozzles in the flow; said spray nozzles comprising at least one water spray nozzle; and at least one atomizing spray nozzle downstream of the at least one water spray nozzle in the flow for producing the droplets of the alkaline solution.

The exhaust pipe may be an exhaust pipe of a marine diesel engine.

While the atomization may also be obtained by single-fluid high pressure nozzles, in an embodiment the at least one atomizing spray nozzle is a two-fluid (alkaline solution and pressurized air) nozzle. Such nozzles that have not been used in the prior art may be selected and controlled for obtaining the desired droplet size.

The installation may also comprise a control and actuation unit capable of controlling the size of the droplets in dependence of engine load during operation.

Other features and advantages of the invention may be apparent from the claims and the following detailed description.

BRIEF DESCRIPTION OF THE DRAWING

FIG. 1 is a view showing diagrammatically an exemplary installation for treatment of exhaust gases from a marine diesel engine.

The drawing is generally of an explanatory nature, so that scale, orientation, size etc. of mutually related components may not correspond to those of a realized installation.

Components having mutually corresponding functions may be designated with same numerals.

DETAILED DESCRIPTION

While the invention may be practised in other fields of treating gases, in the following detailed description the invention is practised on a marine installation.

The marine installation 10 of FIG. 1 is diagrammatically shown inserted in an exhaust flow path of an exhaust pipe 104 of a large diesel propulsion engine 102 of a marine vessel 100. Diesel fuel for engine 102 that may be in the megawatt range regularly contains large quantities of sulphur which are converted to sulphur oxides (SOx) such as $SO_2$ in an exhaust flow 106.

Generally, the installation 10 for reducing these sulphur oxides can be considered as composed of a spraying section 20 and a centrifugal separation section 50 forming serial partitions of the exhaust pipe 106. Spraying fluids are supplied to nozzles 32, 42 of the spraying section 20 by an actuation and control unit 80.

Spraying section 20 is in turn serially partitioned into a water spray section 30 and an alkaline solution spray section 40 having the respective nozzles 32 and 42 that can be arranged in single or in one or more circular arrays surrounding the exhaust flow. The water may be sea water 82, and the alkaline solution 84, such as sodium hydroxide (NaOH), may contain sea water.

The nozzles 32 in the water spray section 30 may be of a single-fluid type as indicated in phantom in FIG. 1, for example, capable of utilizing the kinetic energy of pressurized water to break it up into droplets and spraying the water droplets into the exhaust flow 106. The water droplets cool the exhaust flow and evaporate in the exhaust flow to saturate the exhaust flow with water vapor. They may likewise, however, also be of a two-fluid (two-phase) type, as indicated in full line in FIG. 1.

While the nozzles 42 in the alkaline solution spray section 40 may likewise also be of the single-fluid type as illustrated in phantom in FIG. 1, in the shown full line embodiment they are shown as two-fluid (two-phase) type, capable of atomizing a flow of the liquid alkaline solution 84 into an aerosol of fine droplets by pressurized/compressed air and spraying the aerosol into the vapor-saturated exhaust flow 106. The enlarged encircled full line lower area of FIG. 1 shows a two-fluid atomizing spray nozzle 42 of external-mix type but other types of two-fluid atomizing nozzles may, however, likewise be used.

The droplets of alkaline solution will keep their size as the exhaust flow is already saturated by vapor. The basic alkaline solution in the droplets will react with and neutralize the acid sulphur oxides into salt and water in the droplets. This reaction may take place and be completed in a reaction compartment 62 forming an inner space throughout the separator section 50 and extending upstream more or less throughout the alkaline solution spray section 40.

The separation section 50 has a plurality of centrifugal separators 52. As apparent from the enlarged circular upper area of FIG. 1, each separator 52 has a rotor 54 with a stack of narrowly spaced conical separation discs 56 projecting into the reaction compartment 62. The separators may also be of a more basic type, having radial wings instead of conical discs (not shown) in the rotor. Each separator 52 is of a counter-current type, i.e. where the exhaust flow is radially inwards (arrows P) through the interspaces between the discs 56, against the pumping effect generated by the rotating rotors 52. Such rotor-type centrifugal separators 52 for centrifugal separation of solid and/or liquid particles from a flow of gas, e.g. crank case gases, are previously known per se from e.g. WO 2012/052243 A1.

Each separator rotor 54 is further provided with a fan 64 which rotates together with the rotor 54. The fan 64 is located in a chamber 58 which is separate from and encloses a separator section 68 of the reaction compartment 62 for enhancing the flow of cleaned gas from gas outlet 60 of the rotors 52 to the chamber 58 and further to an outlet 70 of the cleaned exhaust gas. Optionally, instead of an individual fan 64 for each separator 52, a common fan (not shown) may be arranged upstream or downstream of the reaction compartment 62 for feeding the mixture of exhaust gases, water and reaction products through the disc stack of the rotors 54 and discharging the gas of reduced sulphur oxide content to the exhaust gas outlet 70. The separator rotors 54 are driven either by an individual electric motor 72 or by a common electric motor and a belt transmission (not shown), similar to what is shown in FIG. 2 of WO 2012/052243 A1. In the reaction compartment 62 there is at least one outlet 74 for discharging the reaction products and liquids separated-out by the separator rotors 54. Different separator arrangements similar to that described above and usable in the present invention are described in detail in the initially mentioned document WO2018/231105 A1.

The control and actuation unit 80 is shown in an exemplary and simplified manner. Control and actuation unit 80 operates and is briefly configured as follows: Pumps 88 draw and pressurize sea water and alkaline solution from respective sources 82 and 84. A compressor 86 draws and pressurizes ambient air that can be temporarily stored in a pressure accumulator 92. Valves 90 distribute the respective pressurized fluids to the nozzles 32 and 42. Regulators 94 maintain set values of pressure and/or flow. Settings for valves 90 and regulators 94 are controlled by a control unit 96. The settings, such as liquid and air pressure settings for controlling droplet size, are governed by the exhaust gas flow rate that varies in dependence of engine load during operation of vessel 100. Exhaust gas flow rate is obtained by a flow sensor 108 in the exhaust pipe 102.

Unit 80 can be specifically configured to control the size of the droplets generated by a selected type of atomizing nozzles 42 by varying the rates of air and liquid flow therethrough in a manner known per se. With atomizing nozzle type and liquid flow rate already determined, only the air pressure may need to be varied.

The foregoing detailed description is given primarily for clearness of understanding and no unnecessary limitations are to be understood therefrom. Modifications will become obvious to those skilled in the art upon reading this disclosure and may be made without departing from the spirit of the invention or the scope of the appended claims.

The invention claimed is:

1. A method of removing a gas from a flow of a gas mixture, characterized by:
    introducing a first liquid in the flow for evaporative cooling and saturation of the gas mixture;
    providing small droplets of a second liquid capable of dissolving said gas and of a size small enough not to be sedimented by gravitation and big enough to be centrifugally separated;
    spraying the small droplets into the flow for adsorbing and dissolving said gas into the droplets; and
    centrifugally separating the small droplets from the flow, wherein the gas mixture is a combustion exhaust gas.

2. The method of claim 1, comprising introducing the first liquid by spraying small droplets thereof into the flow.

3. The method of claim 2, comprising forming the small droplets of the first liquid by atomization.

4. The method of claim 3, comprising generating the atomization of the first liquid by pressurized air using a two-fluid nozzle or by high-pressure liquid spray using a single-fluid nozzle.

5. The method of claim 4, comprising forming the small droplets of the second liquid by atomization.

6. The method of claim 5, comprising generating the atomization of the second liquid by pressurized air using a two-fluid nozzle or by high-pressure liquid spray using a single-fluid nozzle.

7. The method of claim 2, comprising controlling the size of the droplets of the first and second liquids to vary between 20 and 200 µm.

8. The method of claim 2, comprising spraying the droplets of the second liquid downstream of spraying the droplets of the first liquid into the flow.

9. The method of claim 2, comprising spraying the droplets of the second liquid co-currently with the flow.

10. The method of claim 1, wherein the first liquid is water and the second liquid is an alkaline water solution.

11. The method of claim 1, wherein the gas to be removed is a gas comprising sulphur oxides.

12. The method of claim 1, wherein the gas mixture is an exhaust gas flow from a marine diesel engine and the gas to be removed is a gas comprising sulphur oxides.

13. The method of claim 1, wherein the first liquid and the second liquid are introduced by spraying small droplets thereof into the flow by atomization, generating said atomization by pressurized air using a two-fluid nozzle or by high-pressure liquid spray using a single-fluid nozzle and further comprising controlling the size of the droplets of the first and second liquids to vary between 20 and 200 µm.

14. An installation (10) to be inserted in a path of an exhaust flow of an exhaust pipe (104) for performing the method of claim 10, characterized by
    spray nozzles (32, 42) for the water and the alkaline water solution; and
    at least one centrifugal separator (52) downstream of the spraying nozzles in the flow;
    said spray nozzles comprising
    at least one water spray nozzle (32); and
    at least one atomizing spray nozzle (42) downstream of the at least one water spray nozzle (32) in the flow for producing the droplets of the alkaline solution.

15. The installation (10) of claim 14, wherein the exhaust pipe (104) is an exhaust pipe of a marine diesel engine.

16. The installation of claim 14 or 15, wherein the spray nozzles (32, 42) are single fluid nozzles or two-fluid nozzles.

17. The installation of claim 14, wherein the at least one spray nozzle (42) is oriented for spraying co-currently with the flow and the at least one spray nozzle (32) is oriented for spraying counter-currently with the flow.

18. The installation of claim 14, comprising a control and actuation unit (80) capable of controlling the size of the droplets in dependence of engine load during operation.

* * * * *

UNITED STATES PATENT AND TRADEMARK OFFICE
CERTIFICATE OF CORRECTION

| | |
|---|---|
| PATENT NO. | : 11,654,394 B2 |
| APPLICATION NO. | : 17/436018 |
| DATED | : May 23, 2023 |
| INVENTOR(S) | : Claes Inge et al. |

It is certified that error appears in the above-identified patent and that said Letters Patent is hereby corrected as shown below:

On the Title Page

Item (71) (Applicant), "3NINE AB" should read --Grimaldi Development AB, Nacka Strand (SE)--

Item (73) (Assignee), "ARKALUMEN INC." should read --Grimaldi Development AB, Nacka Strand (SE)--

Signed and Sealed this
Fourth Day of July, 2023

Katherine Kelly Vidal
*Director of the United States Patent and Trademark Office*